No. 764,145. PATENTED JULY 5, 1904.
W. H. McKENNA.
ROTARY METAL CUTTING TOOL.
APPLICATION FILED JUNE 13, 1903.
NO MODEL.

WITNESSES

INVENTOR
William H. McKenna
by his Attorneys
Bakewell & Byrnes

No. 764,145. Patented July 5, 1904.

UNITED STATES PATENT OFFICE.

WILLIAM H. McKENNA, OF PITTSBURG, PENNSYLVANIA.

ROTARY METAL-CUTTING TOOL.

SPECIFICATION forming part of Letters Patent No. 764,145, dated July 5, 1904.

Application filed June 13, 1903. Serial No. 161,320. (No model.)

*To all whom it may concern:*

Be it known that I, WILLIAM H. McKENNA, of Pittsburg, Allegheny county, Pennsylvania, have invented a new and useful Rotary Metal-Cutting Tool, of which the following is a full, clear, and exact description, reference being had to the accompanying drawings, forming part of this specification, in which—

Figure 1:
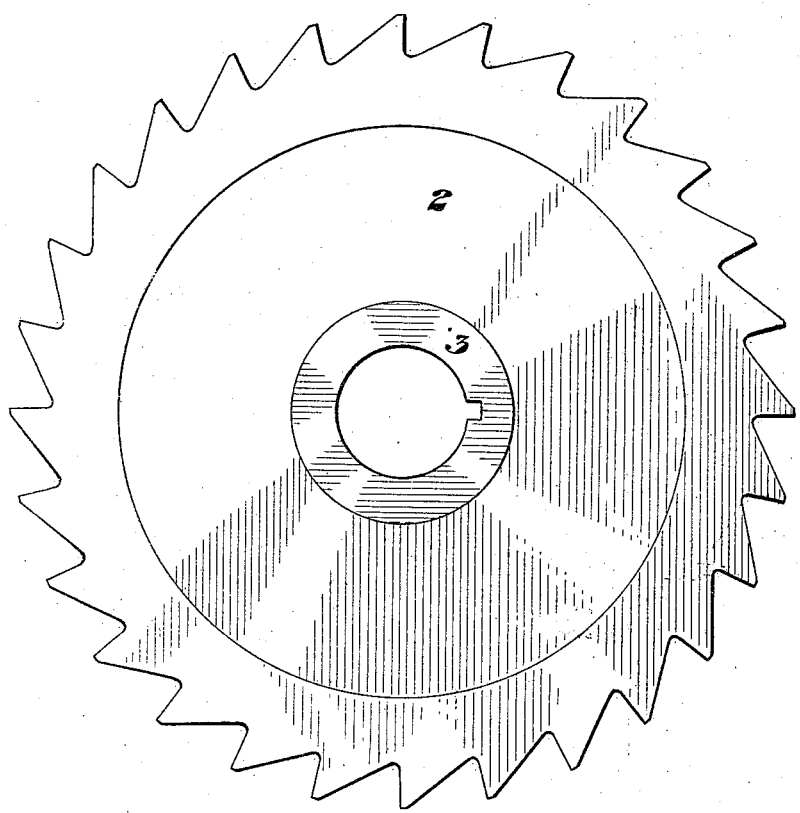
Figure 2:

Figure 1 shows in plan view a milling-cutter constructed in accordance with my invention. Fig. 2 is a section on the line II II of Fig. 1.

Self-hardening steels containing tungsten or molybdenum have been known to be of especial efficiency as cutting-tools; but the impracticability of boring and fitting the center of tools made of such steel has prevented its use in the manufacture of milling-cutters and like rotary tools. I have discovered that such steel can be employed successfully in the manufacture of milling-cutters and similar rotary tools by casting the tungsten or molybdenum steel around a center of iron or soft steel, so as to cause the outer body of tungsten or molybdenum steel to unite permanently to the softer center. In finishing the tool the soft center can readily be bored and machined so as to provide a milling-cutter with a very hard cutting periphery and an accurately finished and machined center.

In the drawings, 2 represents a milling-cutter of tungsten or molybdenum steel, and 3 is a center of soft steel or iron around which the hard peripheral body of steel is cast and with which it is permanently united. The center 3 is of greater original thickness than the body of the cutter 2, so that it may be machined down to the desired final thickness.

I claim—

1. A rotary metal-cutting tool having a single-piece-cutting periphery of self-hardening steel integral with a center of softer material; substantially as described.

2. An integral, rotary metal-cutting tool, consisting of a periphery of self-hardening steel permanently united to a center of soft steel; substantially as described.

In testimony whereof I have hereunto set my hand.

WILLIAM H. McKENNA.

Witnesses:
GEO. B. BLEMING,
JOHN MILLER.